Feb. 24, 1959 J. E. DWYER ET AL 2,874,772
FRENCH PLEATS AND DEVICE FOR FORMING FRENCH PLEATS IN DRAPERIES
Filed Oct. 13, 1954 5 Sheets-Sheet 1
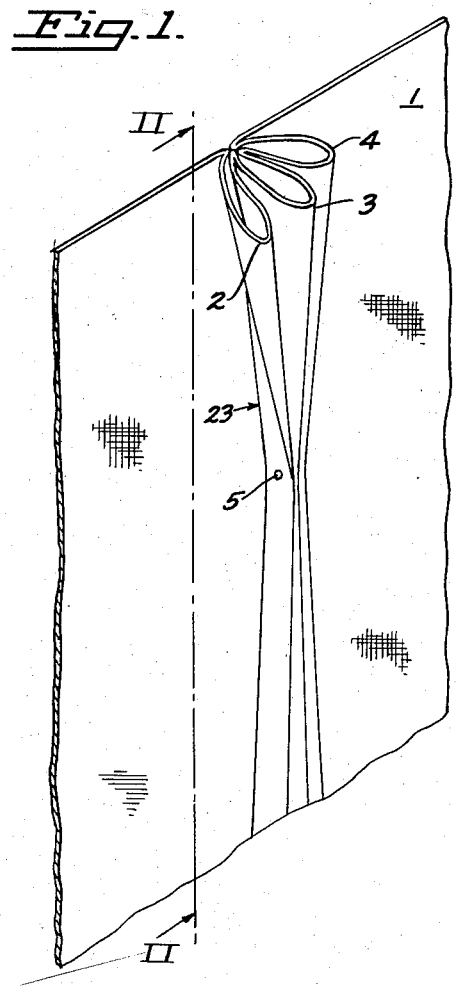
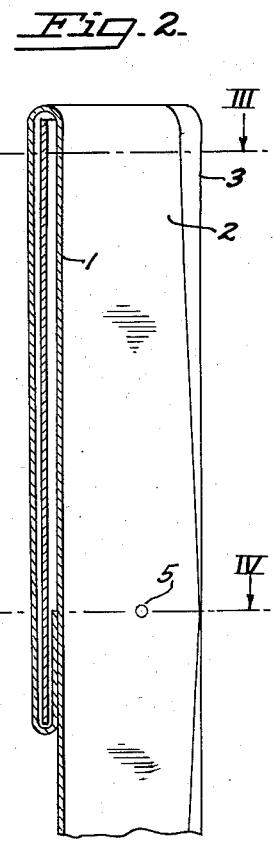
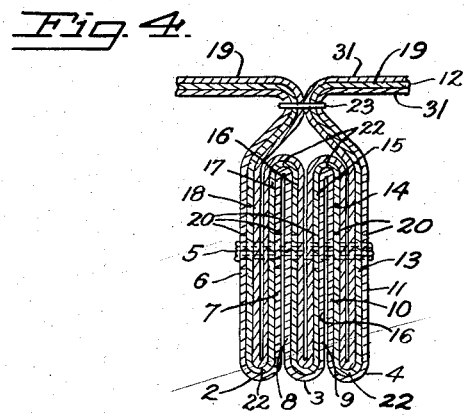
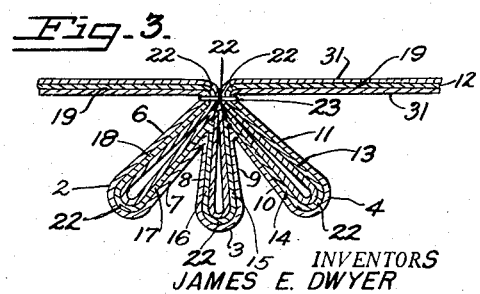
INVENTORS
JAMES E. DWYER
LAWRENCE B. AMBROSE
BY
ATTORNEY

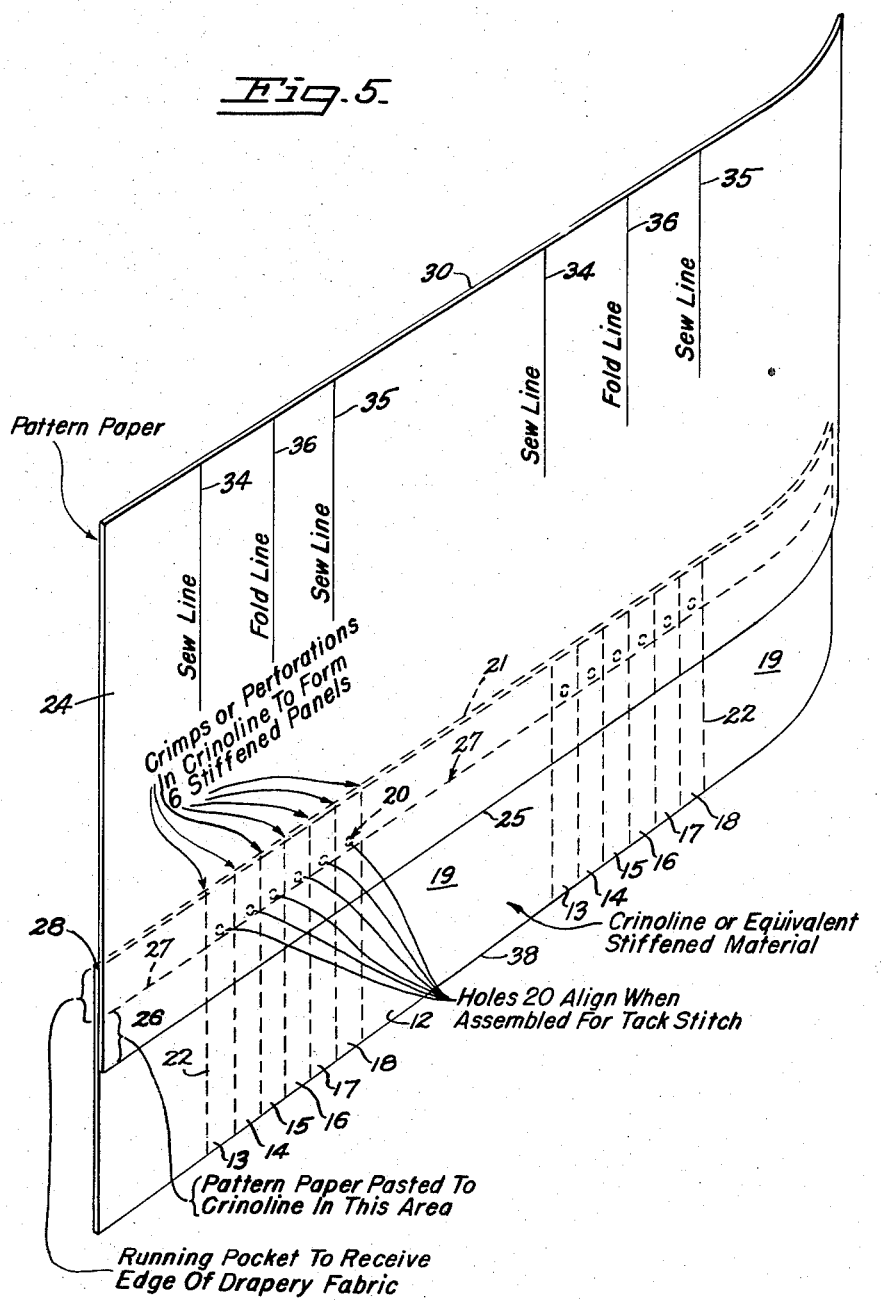

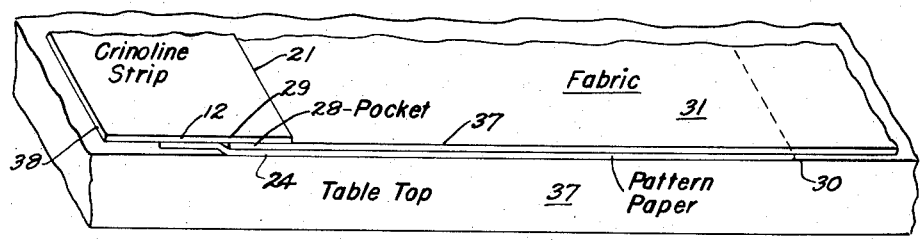
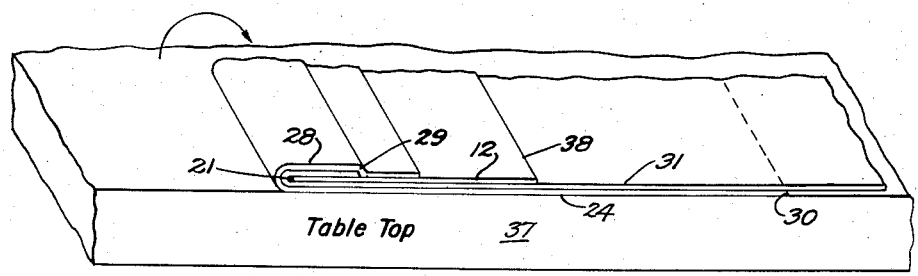
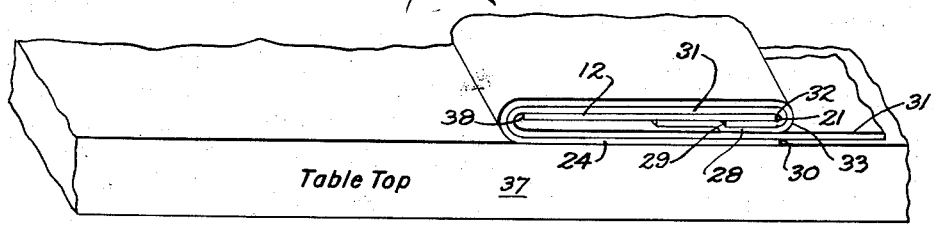

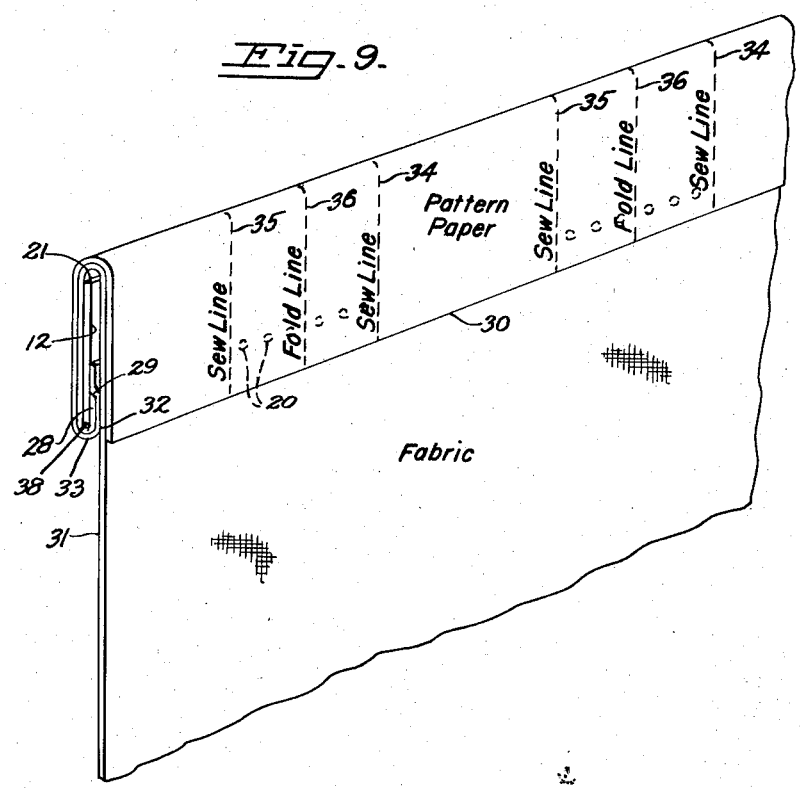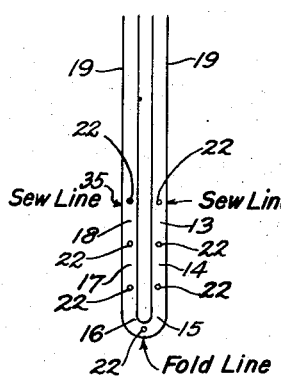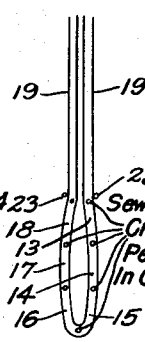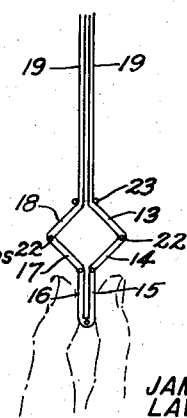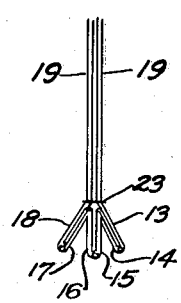

Feb. 24, 1959      J. E. DWYER ET AL      2,874,772
FRENCH PLEATS AND DEVICE FOR FORMING FRENCH PLEATS IN DRAPERIES
Filed Oct. 13, 1954      5 Sheets-Sheet 5
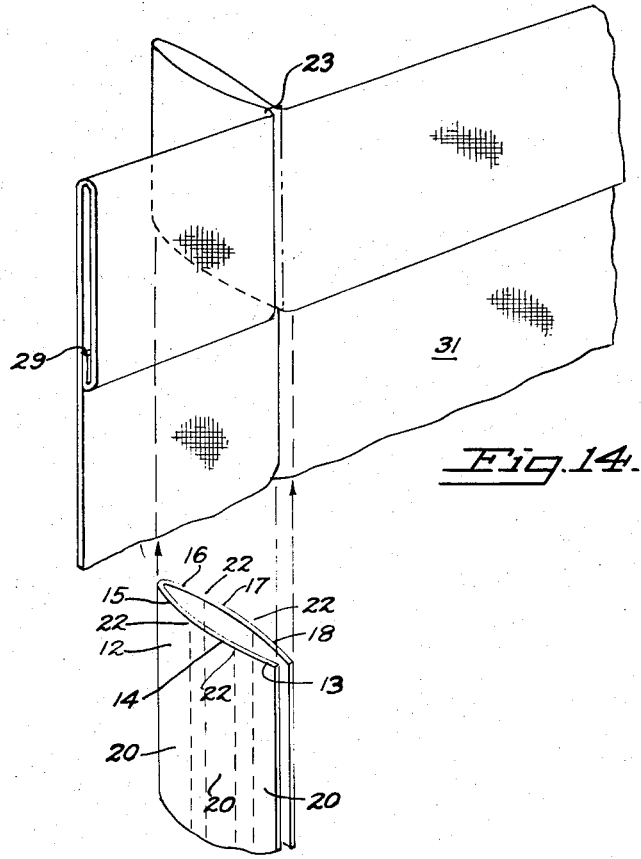
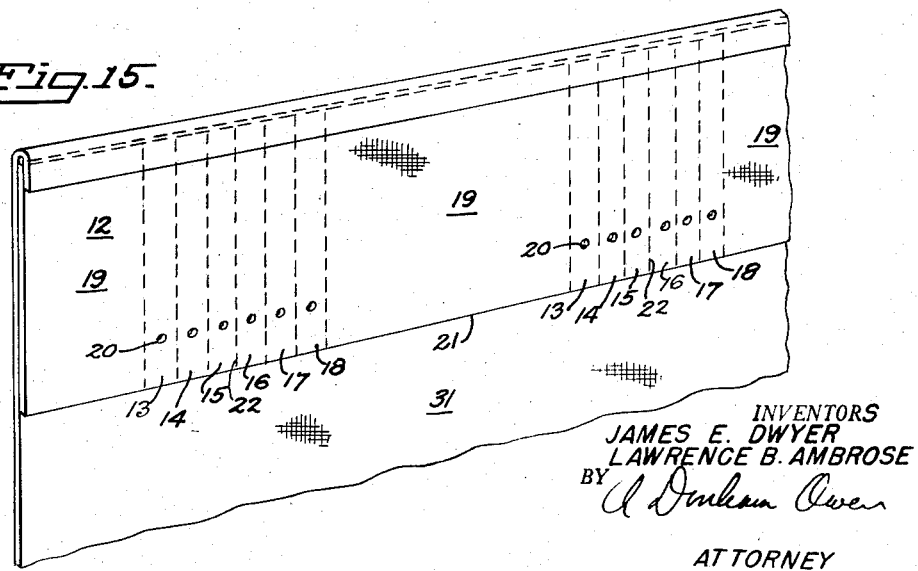
INVENTORS
JAMES E. DWYER
LAWRENCE B. AMBROSE
BY
ATTORNEY

United States Patent Office 2,874,772
Patented Feb. 24, 1959

2,874,772
FRENCH PLEATS AND DEVICE FOR FORMING FRENCH PLEATS IN DRAPERIES

James E. Dwyer and Lawrence B. Ambrose, San Francisco, Calif.

Application October 13, 1954, Serial No. 462,024

5 Claims. (Cl. 160—348)

This invention relates to improvements in French pleats and in devices for forming French pleats in draperies. By means of this invention the most inexperienced person can achieve a perfect result and perfect uniformity in each pleat. No previous instruction is necessary. The device provides a folding and sewing template so a mistake cannot occur.

The present invention in its preferred form encloses the pleat forming device within the folds of the fabric and thus solves the problem existing in earlier forms of pleat devices where a strip of material was sewed to the back side of the drapery and in some installations was an eyesore when viewed through a window.

The present invention allows the use of a simple hook pinned in the back seam of the pleat so the drapery may be adjusted in height in relation to a slide on the rod and thus solves the problem existing in earlier forms of pleat devices which depend upon a bent wire arrangement with multiple tynes to fit into pockets to form the pleat and have an integral hook on the back side to engage the slide on the rod. The problem arises because this hook bears a fixed vertical relation to the pleat. Thus any need for raising or lowering the drape must be accomplished by relocating the rod on the window casing, and this is usually a major operation which leaves the plaster or molding marred.

The present invention cuts the sewing operations to about one quarter the number which have been required heretofore in making a true French pleat and produces a French pleat of superior quality and excellence. Also it provides a positive guide for the seamstress in taking the tuck in the front near the base to hold the pleat assembled and to allow it to flare outwardly above the tuck.

The present invention also solves the problem of forming folds of equal dimension because enclosed between the two layers of the drapery fabric are adjacent stiffened pieces of material supported in relation to each other so as to fold on a predetermined vertical line. The invention also removes the necessity for the person to measure off the space between each set of pleats as this is automatically cared for in the invention.

The true scope and novelty of the invention will be gained from the appended claims and from the following description of a preferred form of the invention. While a few modifications are shown, it is not intended thereby to limit the invention to these, as many equivalents to the several parts comprising the invention will become readily apparent as its principle is understood.

In the drawings:

Fig. 1 is a view in perspective of a completed French pleat formed at the top of a drapery to give it a fullness and softness of line either when drawn to the side of a window or when extended across the window.

Fig. 2 is a view in elevation and partly in cross-section taken on the line II—II of Fig. 1;

Fig. 3 is a view in horizontal cross-section taken on the line III—III of Fig. 2;

Fig. 4 is a like view taken on line IV—IV of Fig. 2 showing the tack stitch. In this as in other views the thickness of the parts is exaggerated for purposes of clarity;

Fig. 5 is a view in perspective of a portion of a strip of one form of our invention for use in making a French pleat. It is shown being taken from a roll from which a piece is cut to match the width of the drapery fabric;

Fig. 6 is a view in perspective and shows the piece of drapery material laid out on a table, with the top edge of the drapery fabric inserted in the running pocket;

Fig. 7 shows the next step which comprises folding the crinoline stiffening material over on top of the fabric, using the edge of the crinoline as the folding guide;

Fig. 8 is a like view in perspective and shows the crinoline and fabric folded over a second time, using the edge of the crinoline as the folding guide. As before noted, the parts are shown thicker and less compacted than in actual practice to aid illustration in these drawings. At this point also, the preferred practice is to run an iron over the folded fabric, to form creases in it at the folds along the edges of the crinoline. In lieu of this, pins may be used where a fabric is difficult to retain in the running pocket;

Fig. 9 is a view in perspective of the fabric, the enclosed crinoline and the overlaying pattern paper, ready for folding into position for the sewing operation;

Fig. 10 is a diagrammatic view showing the top edge of the drape folded along the fold line with the sew lines in alignment. In Figs. 10 to 13 the drapery fabric and the stiffening material are shown as one for purposes of clarity;

Fig. 11 is a like view after the person has stitched along the sew line. The dots represent the crimp or perforations which separate the crinoline into six independent stiffened panels. It is along these crimps or lines of perforations that the crinoline folds, much as in the case of a fan or a panel screen;

Fig. 12 is a like view showing how the person grasps the fabric near the outer fold and pushes it toward the sew line, which causes the adjacent two panels to jackknife and the middle panels move inwardly into the position shown in Fig. 13. In the latter position the tack pleat holes are aligned and the person completes the stitch shown in Fig. 4, to complete the pleat.

In actual practice the person will prefer to seam all the pleats as shown in Fig. 11, and then give her attention to completing each pleat as shown in Figs. 12, 13 and 4.

Fig. 14 is a view in perspective showing a modified form of the invention in which a short strip of panels of crinoline is inserted in under the fold into a pocket formed after the seam on the fabric has been completed, instead of using a continuous strip of crinoline and having a pocket between the crinoline and the paper pattern into which the fabric is inserted.

Fig. 15 is a view in perspective showing another modified form of the invention employing less drapery material and in which the crinoline strip is exposed on the backside of the fabric. In this form of the invention no paper pattern need be used.

The important step in the practice of the present invention is to get into the folds of the fabric at its top edge a series of adjacent stiffened members which will serve automatically to divide and support the fabric in a series of panels so the material will fall into the correct spaced and shaped pleats needed to form the complete French pleat. These stiffening members may be made of any material which will not injure the sewing machine. We prefer to use crinoline, a material well known to the seamstress, and well adapted to use in this invention, although as noted later other materials may be used. Crinoline is a woven fabric, treated with a suitable stiffening substance. It stands up well when the drapes are cleaned or washed. It lends itself to easy preparation for the invention because the crimp or perforations between each panel may be made by piercing, by bending as in crimping, or by cutting, leaving a connecting web to support the panels.

In addition to the foregoing basic requirement for our invention we have found an added benefit to the person if the crinoline stiffening material is combined with a pattern which overlays the folded fabric during the sewing operation and thus requires less skill on the part of the person in every step of the making of the French pleat. The invention is illustrated and will be described in this preferred embodiment, but we want it distinctly understood that in thus complying with the statutory requirement we are not relinquishing our right to other equivalent embodiments rightfully included within the appended claims.

As noted earlier and as shown in Fig. 1 a French pleat is used at four inch spaced intervals along the top 1 of a drapery to achieve a desirable decorative effect. It usually comprises three folds 2, 3, and 4 in the fabric which are gathered together by a tack stitch 5 about three inches down from the top edge. This means then that the tuck is composed of six vertical panels 6, 7, 8, 9, 10 and 11.

Our invention, which enables the most inexperienced person to make perfect French pleats, is shown in its preferred form in Fig. 5. It is adapted to be made in continuous strips and rolled on reels from which the customer can buy as much as needed.

The crinoline or equivalent stiffened material 12 comprises a strip about four inches wide. The usual practice is to space the French pleats four inches apart; so we arrange each set of panels 13, 14, 15, 16, 17 and 18 that distance apart with the panel 19 in between.

In a factory where drapes are made in large quantities a machine is used to sew through the six layers of material to make the tack stitch 5. (See Fig. 4.) We make this easy for the home person by perforating the panels 13 to 18 at 20 about three fourths of an inch up from what will be the lower edge 21 of the crinoline in the completed drape. These holes 20 align and provide a guide path so a needle can be passed through in making the tack stitch 5. The tack stitch can be near the front of the folds or at some point farther in depending upon the person's choice. Where it is to be will be influenced by the location of the holes 20 in the panels.

The crimps or line of perforations 22 which facilitates the panels 13 to 19 folding easily into a fan or accordion pleat shape, may be formed in any number of different ways. We have tried successfully using a series of closely spaced needle pricks such as are formed by a needle in sewing a seam. We have found that the line of perforations between each panel 19 and the adjacent panels 13 and 18 can be omitted, as the sewing of the vertical seam 23 accomplishes this. We have found piercing the crinoline with cuts, leaving connecting webs works well. Also we find breaking the sizing in the crinoline by a crimping die will work.

All the operations on the crinoline so far described are preferably done before the paper pattern is secured to it.

The paper pattern 24 is made of a tough, thin paper adapted to easy flexing. Its edge 25 is secured to the crinoline 12 by pasting. Where the crinoline is four inches wide we prefer to have the edge 25 on the pattern about two inches in from each edge and to have the paste 26 extend about an inch or to the line 27. This leaves a running pocket 28 an inch deep extending in from the edge of the crinoline 12, and in this pocket the person lays the top edge 29 of the drapery fabric.

The paper pattern 24 extends in width beyond the edge 21 of the crinoline by a distance equal to approximately eight inches to its edge 30. In other words it is about twice the width of the crinoline strip so that when the drapery fabric 31 is enfolded in the pattern paper (see Fig. 8) the edge 30 comes about even with the lower edge 32 of the fold 33.

Extending inwardly from the edge 30 of the paper pattern 24 are the markings to guide the person in completing the French pleat. The sew lines 34, 35 extend about four inches in from the edge 30, as does the fold line 36. The fold line 36 is in alignment with the perforations between the panels 15 and 16. The sew lines 34, 35 are in alignment respectively with the perforations between the panel 19 and panel 13, and the panel 18 and its adjacent panel 19. When the edge of the fabric has been folded and is ready to be sewed these lines fall into correct position as shown in Fig. 9.

Our method will now be reviewed in the order a person would take the several steps.

First she will measure the width of the drapery fabric laid out on a flat work surface 37 and will cut a strip of crinoline 12 and attached pattern paper 24 of the same size. This will be laid paper side down as in Fig. 6 and the top edge 29 of the fabric 31 will be inserted full depth into the running pocket 28. Then she will lift the edge 38 of the crinoline strip 12 and lay it over on top of the fabric 31, using the edge 21 of the crinoline as a guide. (See Fig. 7.)

Next she will lift the folded parts and complete the fold, pivoting the material 31, the pattern 24 and the crinoline 12 about the edge 38 of the crinoline, so the parts in cross section are in the general arrangement shown in Fig. 8.

At this point it is preferable to pass an iron over the enfolded parts as ti will give better control of the fabric 31 during the sewing and pleating steps.

The person now holds the enfolded parts in the assembled condition shown in Fig. 9 with the sew lines and fold line in view. Then she folds the parts on the fold line 36 which brings the sew lines 34 and 35 into alignment. She sews through the parts and ends up with them in the condition shown diagrammatically in Fig. 11. Before completing this pleat she will probably bring the other pleats into this state, then she will tear off the paper pattern 24 as it will have served its purpose.

Next she will complete each pleat, which she does by grasping the fabric 31 and the underlying crinoline panels 15 and 16 between her thumb and forefinger. When they are closed together she pushes the folded parts inwardly toward the seam 23 which causes the panels 13 and 14, and the panels 17 and 18 to bow outwardly as shown in Fig. 12, and when the panels 15 and 16 have been pushed in as far as they will go toward the seam 23, the three folds 2, 3 and 4 are complete. She will now grasp the three folds 2, 3 and 4 between her thumb and forefinger and with needle and thread in her other hand will complete the tack stitch 5, passing the needle and thread back and forth through the aligned holes 20 in the panels 13 to 18. This will leave the tops of the folds 2, 3 and 4 free to bow outwardly into a graceful position as shown in Fig. 1.

Although we have described the invention on a basis of four inch spacing between pleats and a four inch vertical pleat, these dimensions may be varied to suit. Also another factor that may call for increasing the three-quarter inch width of the panels 13 to 18 is where a very heavy fabric is being used.

Another variation may be to use the crinoline without the paper pattern 24 or with the latter separate from the crinoline. These are not as efficient as the preferred form but might be used by one seeking to avoid the appended claims while still making use of the invention.

For example, an alternative method which embodies the essence of our invention would be to use the paper pattern 24 separately from the crinoline panels 13 to 18, and not have the crinoline in a continuous strip. In this method the top-folds in the fabric would be made as in Fig. 8 except that the crinoline strip comprising the panels 13 to 18 would be omitted. The panels 19 might or might not be used in connection with the paper pattern.

When the top folds were made, and preferably an iron was passed over it, the person would fold the parts as in Fig. 11 and would make the seam 23 according to the pattern 24 but as yet there would be no crinoline panels enclosed. When the seam 23 was completed, the person would then slip in under the fold a piece of crinoline 12 having only the six panels 13 to 18 and the holes 20 for the tack stitch (see Fig. 14). Then she would complete the pleat as in Figs. 12, 13, and 4. The tack stitch 5 would hold the crinoline securely in the fold.

Another alternative method employing the basic concept of our invention would be not to use the paper pattern, but instead the seamstress would fold the fabric along the top edge so as to have a double thickness of material as in Fig. 8. (See Fig. 14.) Then (a) she would mark off along the top the places where the center of the French pleat was to come (corresponding to the fold line between panels 15 and 16) or (b) she would mark off the sew lines (corresponding to the sew lines 34 and 35 on the pattern). Under (a) she would fold the material along the vertical line and run a stitch like 23 (Fig. 11) back two inches from the fold; or under (b) she would make the stitch 23 connecting the two points marked. Then in either case, she would slide a crinoline insert into the fold. This insert would have the six panels 13 to 18 and the tack stitch holes 20, so by following the procedure shown in Figs. 12, 13 and 14 she would complete each pleat and the tack stitch 5 would hold the crinoline insert in place.

As previously suggested, instead of crinoline for the stiffening panels 13 to 18 other materials may be used which will supply the support and guiding needed in forming the pleat. Should the stiffener be made of a material more brittle than crinoline, the dividing lines 22 between the panels 13, 14, 15, 16, 17 and 18 can be partially weakened, then when the person has reached the stage in the job shown in Fig. 11 and moves the panels into the position of Figs. 12 and 13 the remaining material on the dividing lines 22 will break and thus leave six properly spaced stiffeners 13, 14, 15, 16, 17 and 18 backing up the six fabric panels 6 to 11. The vertical webs may be the material itself or separate hinge means.

Another modification, although less desirable, would consist in completing the folding of the top edge of the drape fabric, either with a fold of double thickness or of single thickness (see Fig. 15) and then applying on the back side at the top edge by sewing or adhesive a strip of crinoline substantially like the strip 12 in Fig. 5. No paper pattern 24 would be used. The person would then fold the drape fabric and the crinoline on the fold line 22 dividing the panels 15 and 16 and would bring into alignment the crimp or perforations 22 separating the panel 19 from the panel 13 and the panel 19 from the panel 18. She would then sew along the latter lines making the seam 23. Next she would do as shown in Figs. 12 and 13 and complete the pleat by the tack stitch 5 through the holes 20. The principal disadvantage of this method, where the crinoline strip 12 is exposed on the back of the drapery fabric, is the fact that it shows and may be unattractive if seen from the outside of the home. However, it does, like all the other alternatives, possess the advantage of providing a positive stiffened panel behind the fabric of each fold 2, 3, and 4 to aid in forming the pleats accurately and quickly.

The advantages of our invention in its preferred form are many. The running pocket 28 saves time besides securing a uniform turnover without measuring. The paper pattern shows immediately where the back seam 23 of the pleat is to be made, and without any measuring or calculations by the seamstress. Except for the hand stitch 5 on the tack, this is the only sewing needed in making the complete pleat. The paper is then torn away. The crinoline provides a semi-stiff heading for the drapery which gives it a professional appearance. The back seam 23 provides a secure anchor for the standard pin type drapery hook to engage in the seam. Thus the housewife can adjust the drapes up or down in relation to the rod, merely by changing the location of the drapery hook in the seam.

What is claimed is:

1. An aid for the making of French pleats in draperies comprising a strip of stiffening material, having thereon at each place where each pleat is to be formed a pair of adjacent vertically extending narrow panels, said panels being joined by a web which bends more easily than said panels, and a strip of pattern material secured at one of its edges to said stiffening strip, said pattern strip having means thereon in general alignment with the web connecting the outermost of said narrow panels with said strip of stiffening material to indicate where an upper marginal portion comprising a pleat of the drape is to be secured together by a vertical seam.

2. The device of claim 1 in which said pattern material is secured back from the edge of said strip of stiffening material to provide a running pocket to receive the edge of the drapery fabric to hold it during the making of said pleats without having to sew said strip of stiffening material to said drapery fabric.

3. The device of claim 1 in which said strip of stiffening material is made of crinoline and in which said strip of pattern material is made from thin pattern paper.

4. A device for aiding in making French pleats in draperies comprising a stiffening strip having at each place where folds for each pleat are to be formed a pair of adjacent vertically extending narrow panels joined by a web which bends more easily than said panels, and a paper pattern strip secured at one of its edges to said stiffening strip so that the drapery fabric can be sandwiched between said stiffening strip and said pattern strip and folded around to enclose said stiffening strip so that it is no longer visible while said pattern strip is still visible and in alignment with said stiffening strip, said pattern strip having means thereon in general alignment with each web connecting each outermost narrow panel with the major portion of said stiffening strip to indicate where upper marginal portions of said drape are to be secured by a vertical seam defining the ends of each French pleat, said pattern strip thereafter being torn away.

5. An aid for making French pleats in drapery fabric comprising a stiffening strip having at each place where a French pleat is to be formed a plurality of adjacent vertically extending panels joined by webs which bend more easily than the panels, the outer webs at each group being adapted for being sewn together and a paper pattern strip secured along one of its edges to said stiffening strip back from the edge of said stiffening strip to provide a running pocket for directly receiving and holding the edge of said drapery fabric sandwiched between said stiffening strip and said pattern strip, whereby said drapery fabric may be folded over to enclose the stiffening strip while the pattern strip is still visible and is still in alignment with the stiffening strip, thereby holding the drapery in the proper position without the need for lengthwise stitching of the stiffening strip to said drapery fabric, said pattern strip having indicia in general alignment with the outer webs of each group of panels for indicating the sew line through which said drapery fabric and stiffening material are to be sewed together at each fold.

References Cited in the file of this patent

UNITED STATES PATENTS

| | | |
|---|---|---|
| 1,958,436 | Hess | May 15, 1934 |
| 2,090,610 | Lyttle | Aug. 17, 1937 |
| 2,595,549 | Sherman | May 6, 1952 |
| 2,623,582 | Handley | Dec. 30, 1952 |
| 2,646,116 | Freeman | July 21, 1953 |